United States Patent [19] [11] 3,726,138
Kosakowski et al. [45] Apr. 10, 1973

[54] DIGITAL DISPLACEMENT AND DISPLACEMENT RATE GENERATOR

[75] Inventors: Henry Robert Kosakowski, Denville; Casimir Stanley Smialowicz, Livingston, both of N.J.

[73] Assignee: The Bendix Corporation, Teterboro, N.J.

[22] Filed: Sept. 16, 1971

[21] Appl. No.: 181,021

[52] U.S. Cl. .................................. 73/179, 73/384
[51] Int. Cl. ............................................ G01c 21/00
[58] Field of Search ............... 73/179, 178 R, 182, 73/384, 386, 387

[56] References Cited

UNITED STATES PATENTS 3,572,115 3/1971 Feuer ........................................ 73/179

*Primary Examiner*—Donald O. Woodiel
*Attorney*—Anthony F. Cuoco et al.

[57] ABSTRACT

Apparatus for generating digital displacement and displacement rate signals directly from a sensed condition and as a closed loop function of the condition for increased accuracy and stability.

7 Claims, 1 Drawing Figure

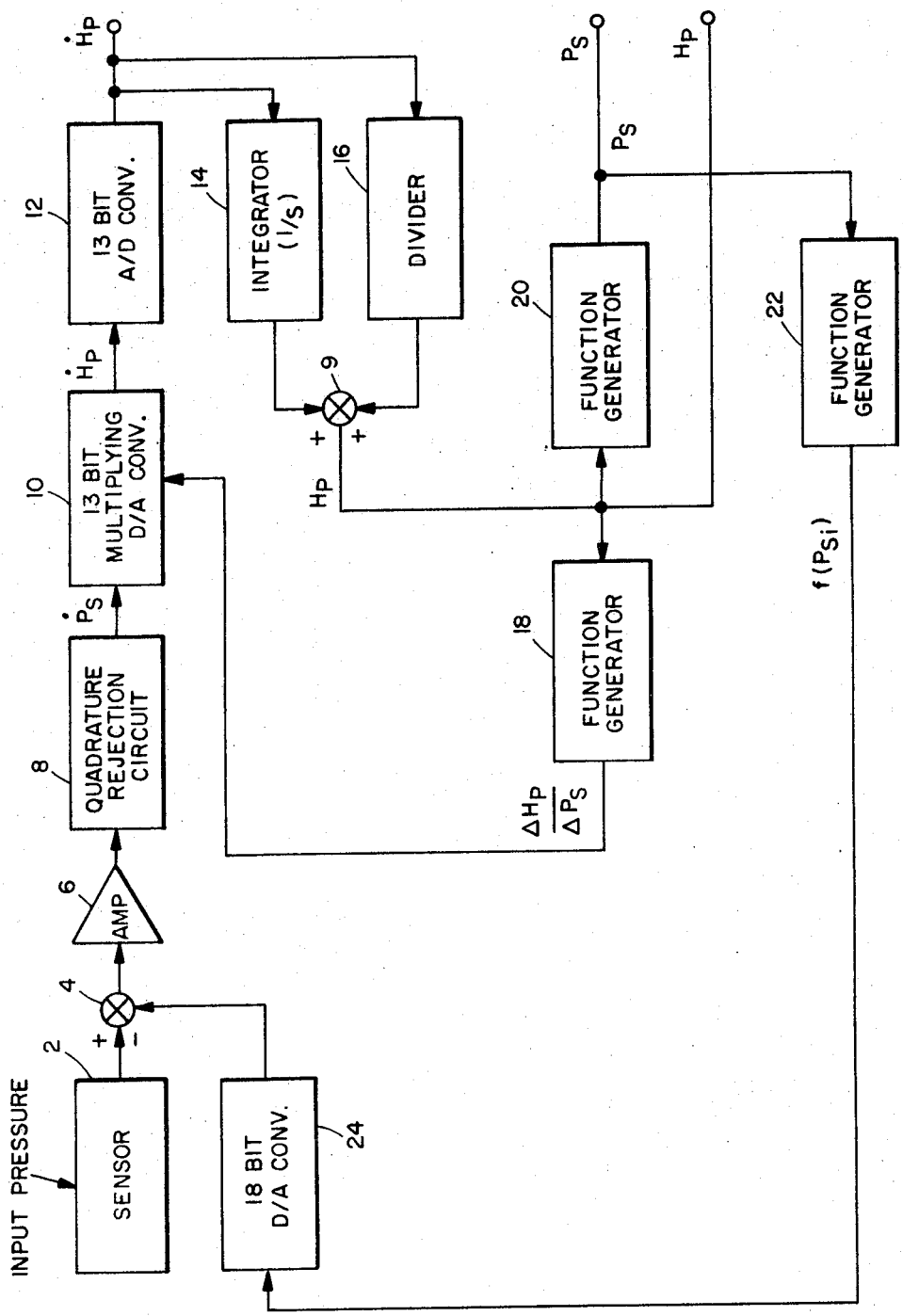

DIGITAL DISPLACEMENT AND DISPLACEMENT RATE GENERATOR

BACKGROUND OF THE INVENTION

1. Field of the Invention

This invention relates to providing digital displacement and displacement rate signals and, particularly, to providing digital altitude and altitude rate signals directly from the output of a digital pressure rate sensor system.

2. Description of the Prior Art

Standard systems for providing rate have included means for differentiating displacement since rate is the first derivative of displacement. In analog systems, analog rate generators are used to generate rate signals. In digital systems an approximation to this approach is obtained by measuring change for a fixed time or time for a fixed change. The fixed time or change must be relatively large to obtain resolution and the large time or change limits the accuracy obtainable. Prior to the present invention there have been digital systems which generated pressure rate directly and then integrated pressure rate to provide pressure displacement. While devices of this type are adequate if small rate changes are involved, they breakdown when larger rate changes must be accommodated due to the need for analog to digital converters of 16 bits or more.

SUMMARY OF THE INVENTION

This invention contemplates a digital altitude and altitude rate generator for generating altitude rate directly, rather than generating a pressure rate, which is then integrated to provide altitude. The altitude rate generator is an integral part of the pressure sensor feedback loop which greatly improves accuracy and stability. Since rate is a measure of change of displacement, altitude rate is generated by the same signal causing the altitude to change, and thus the digital rate signal is a precise measure of altitude rate at all times for every altitude pressure variation.

One object of this invention is to provide means for generating an altitude rate signal as a closed loop function of sensed pressure for improved accuracy and stability.

Another object of this invention is to provide a system of the type described wherein resolution and range can be easily varied to meet system requirements.

Another object of this invention is to provide novel means for obtaining a direct altitude rate output from a digital pressure rate sensor system.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and not to be construed as defining the limits of the invention.

DESCRIPTION OF THE DRAWINGS

The single FIGURE in the drawing is a block diagram of a system according to the invention.

DESCRIPTION OF THE INVENTION

Input pressure is sensed by a pressure sensor 2 which provides a corresponding analog output signal. Input pressure sensor 2 may be a solid state pressure sensor such as described in U. S. Pat. No. 3,323,358 issued to A. Fraioli and assigned to The Bendix Corporation, assignee of the present invention.

The analog signal from pressure sensor 2 is applied through a summation means 4 and an amplifier 6 to a quadrature rejection circuit 8 of a conventional type which provides an error signal corresponding to pressure rate $\dot{P}_s$.

The output from quadrature rejection circuit 8 is applied to a conventional type 13 bit multiplying digital to analog converter 10. A digital signal corresponding to the ratio of the change in altitude to the change in pressure $\Delta H_p/\Delta P_s$ is provided by a function generator 18 and converted to an analog signal by converter 10 which multiplies signal $\dot{P}_S$ by the analog ratio signal to provide an analog altitude rate signal. A conventional type 13 bit analog to digital converter 12 converts the analog altitude rate signal to a digital altitude rate signal $\dot{H}_p$.

Digital signal $\dot{H}_p$ from converter 12 is applied to an integrator 14 which integrates the signal by successive addition every 0.01 seconds, for example. Signal $\dot{H}_p$ is applied to a divider 16 which provides a signal corresponding to approximately one percent of the signal. The output from integrator 14 and the output from divider 16 are applied to a summing means 9 and added thereby to provide a digital altitude signal $H_p$. The addition of the signal from divider 16 and the integrator signal is for purposes of stabilizing the control loop.

Signal $H_p$ from summation means 9 is applied to digital function generator 18 for generating the heretofore noted altitude/pressure ratio signal and is applied to digital function generator 20 which converts digital altitude signal $H_p$ to a digital pressure signal $P_S$.

Signal $P_S$ from function generator 20 is applied to a function generator 22. Function generator 22 has the characteristics of sensor 2 built in so that the output of the function generator is a digital representation of the analog output of sensor 2 for equivalent $P_{st}$ inputs. Function generators 18, 20 and 22 may be convention digital equipment such as read only memory ROM devices responsive to the respective input signals for providing the desired output functions.

The digital output from function generator 22 is applied to conventional 18 bit digital to analog converter 24 which converts said output to an analog signal. The analog signal is subtracted from the output of sensor 2 by summing means 4 to provide an error signal which is amplified by amplifier 6 and applied therefrom to quadrature rejection circuit 8 as heretofore noted.

It will now be understood that altitude rate is altitude differentiated with respect to time. Therefore, if altitude rate is integrated with respect to time altitude is obtained.

In the device of the invention, digital techniques are used to integrate $\dot{H}_p$ and rate feedback, convert $H_p$ to $P_S$ and $\Delta H_p/\Delta P_S$ and return the resulting functions back to analog form to close the control loop. Making use of digital circuitry in this manner greatly increases the accuracy in generating digital altitude and altitude rate signals and imparts greater stability to the system.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A digital displacement and displacement rate generator system, comprising:
    means for sensing a condition and for providing a corresponding signal;
    means connected to the sensing means and responsive to the condition signal for providing an analog condition rate signal;
    a function generator for providing a digital signal corresponding to the ratio of the change in the sensed condition to a change in displacement;
    means connected to the analog condition rate signal means and to the function generator and responsive to the signals therefrom for providing an analog displacement rate signal;
    a converter for converting the analog displacement rate signal to a digital displacement rate signal; and
    means connected to the digital displacement rate signal means and responsive to the signal therefrom for providing a digital displacement signal.

2. A system as described by claim 1, including:
    a second function generator connected to the last mentioned means and responsive to the signal therefrom for providing a digital condition signal.

3. A system as described by claim 1, wherein the means connected to the digital displacement rate signal means and responsive to the signal therefrom for providing a digital displacement signal includes:
    an integrator for integrating the displacement rate signal;
    means connected to the displacement rate signal means for providing a signal in a predetermined proportion to the rate signal; and
    means connected to the integrator and to the proportion signal means for combining the signals therefrom to provide the digital displacement signal 4. A system as described by claim 3, wherein:
    the function generator is connected to the combining means and provides the digital ratio signal in response to the digital displacement signal; and
    the means connected to the analog condition rate signal means and to the function generator and responsive to the signals therefrom for providing an analog displacement rate signal includes means for converting the digital ratio signal to an analog ratio signal.

5. A system as described by claim 2, including:
    a third function generator connected to the second function generator and responsive to the digital condition signal for providing a digital signal representative of the analog signal from the sensing means for equivalent condition inputs;
    means for converting the digital equivalent signal to an analog signal; and
    the means connected to the sensing means and responsive to the condition signal for providing an analog condition rate signal includes means for combining the condition signal and the analog equivalent signal, means for amplifying the combined signal and a quadrature rejection circuit connected to the amplifying means for providing the analog condition rate signal.

6. A system as described by claim 1, wherein:
    the means connected to the integrator and to the proportion signal means for combining the signals therefrom to provide the digital displacement signal includes means for adding said signals.

7. A system as described by claim 5, wherein:
    the means for combining the condition signal and the analog equivalent signal includes means for subtracting said signals.

* * * * *